(12) United States Patent
Williams et al.

(10) Patent No.: US 7,772,166 B1
(45) Date of Patent: Aug. 10, 2010

(54) CONDUCTIVE CEMENT FORMULATION AND APPLICATION FOR USE IN WELL

(75) Inventors: Robert Williams, Houston, TX (US); Emmanuel Therond, Houston, TX (US); Terry Dammel, Houston, TX (US); Mitchell Gentry, Midland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/773,472

(22) Filed: May 4, 2010

Related U.S. Application Data

(62) Division of application No. 11/947,881, filed on Nov. 30, 2007, now Pat. No. 7,732,381.

(51) Int. Cl.
*C09K 8/467* (2006.01)
*C04B 7/00* (2006.01)
*C04B 14/00* (2006.01)
*E21B 47/12* (2006.01)
*E21B 33/14* (2006.01)

(52) U.S. Cl. .................. 507/269; 106/638; 106/717; 166/250.01; 166/292

(58) Field of Classification Search .................. 507/269; 106/638, 717; 166/250.01, 292
See application file for complete search history.

(56) References Cited

U.S. PATENT DOCUMENTS

| 2005/0008845 A1 | 1/2005 | Hatanaka et al. |
| 2007/0062691 A1 | 3/2007 | Reddy et al. |
| 2007/0240620 A1 | 10/2007 | Ramme |

FOREIGN PATENT DOCUMENTS

| WO | 02/40799 | 5/2002 |
| WO | 2006/091185 | 8/2006 |

OTHER PUBLICATIONS

Database WPI Week 198132 Thomson Scientific, London, GB; AN 1981-57578D XP002514880 & JP 56 073663 A (Sekisui Chem Ind Co Ltd) Jun. 18, 1981 Abstract.
Ping Xie, Ping Gu "Electrical Percolation Phenomena in cement Composites Containing Conductive Fibres" Journal of Materials Science, 31 (1996) 4093-409.
H.W. Whittington "The Conduction of Electricity Through Concrete" Magazine of Concrete Research, vol. 33, No. 114, Mar. 1981.
J.R. Farrar "Electrically Conductive Concrete" GEC Journal of Science &. Technology, vol. 45, No. 1, 1978.

*Primary Examiner*—Timothy J. Kugel
(74) *Attorney, Agent, or Firm*—David Cate; Robin Nava; Jeff Griffin

(57) ABSTRACT

Method for cementing a well comprising a hydraulic cement, water, carbon fiber and graphite are provided. The synergy achieved from combining fibers and particulates into the same sample results in a composite slurry with improved electrical properties and easy-to-optimize rheologies. Method for measuring resistivity through casing thanks to the nature of the cement composition is also provided.

20 Claims, 4 Drawing Sheets

CONDUCTIVE CEMENT FORMULATION AND APPLICATION FOR USE IN WELL

This application is a Divisional Application of U.S. patent application Ser. No. 11/947,881 filed on Nov. 30, 2007 which issued as U.S. Pat. No. 7,732,381 on Jun. 8, 2010.

FIELD OF THE INVENTION

The present invention broadly relates to well cementing. More particularly the invention relates to a conductive cementing composition and methods of placing such cementing composition in a well, such as an oil or gas well.

DESCRIPTION OF THE PRIOR ART

Cement in oil and gas wells is typically placed in the annular gap between the drilled formation and the steel casing. Its primary function is to prevent any fluid communication between the drilled formations in order to provide long-term zonal isolation. Zonal isolation must be achieved during the life of the well and after its abandonment. Cement has been used for more than seventeen years in oilwell applications. Also, cement has great versatility as an engineering material, demonstrating superior compressive and tensile strengths, ductility, and flexibility over a wide density range, depending on the additives chosen during design.

However, conventional cements also typically exhibit high electrical resistivity values and are generally considered good insulators of electrical current. This property can be an advantage or a disadvantage for certain applications. For example, in one study, the measured dry resistivity values of cement range from $6.54 \times 10^3$ to $11.4 \times 10^5 \Omega$ per centimeter. Other studies have reported that the addition of particulates and fibrous conductive materials may significantly improve the electrical properties of the cement composite materials. With the proper addition of conductive materials, acceptable cement electrical properties have been achieved with standard Portland cement or concrete composites. Most of these studies have been performed on standard Type I or other construction-grade cement.

Oilwell cement, on the other hand, is exposed to a different set of temperature and pressure conditions, depending on depth and lithology. Moisture conditions also change from well to well. Since cement is a porous material, and porous mediums have been found to follow Arps law with respect to temperature, it is important to include cement porosity as a variable in resistivity measurements. Two types of porosity should be considered in this discussion: initial and final porosity. In initial or "slurry" porosity, the ratio of mix water to cement slurry is expressed as a percentage of total volume. The final or "set" porosity is expressed as the ratio of pore/void volume to total volume of the set material. Based on earlier findings, resistivity of set cement is directly proportional to the final connected porosity, as well as the ionic character of the interstitial fluid. Final results suggested that extended cement samples with high final or "connected" porosity (~59.5%) had the best conductivity of the samples tested.

The major drawback to high-porosity cement systems is the dramatic reduction in mechanical and long-term zonal isolation properties, when compared to lower-porosity cement samples. Therefore, extended systems have not been considered a suitable long term solution for cased hole formation resistivity measurements.

For this reason, it is important to develop a low-porosity oilwell cement technology with excellent electrical properties and independent of initial or final porosity.

SUMMARY OF THE INVENTION

The invention provides a cement slurry composition for cementing a well comprising: a hydraulic cement, water, carbon fiber and graphite. Compositions of the current invention combine the benefits obtained from adding carbon fiber and graphite to the cement composite. The synergy achieved from combining fibers and particulates into the same sample results in a composite slurry with improved electrical properties and easy-to-optimize rheologies.

Preferably, the carbon fiber is present in an amount not exceeding 5 kg per cubic meter and more preferably, between 0.5 and 2 kg per cubic meter.

Preferably, the graphite is present as coarse particulate graphite in an amount not exceeding 50% by weight of dry blend and more preferably, in an amount between 20% and 50% by weight of dry blend.

In another embodiment the slurry further comprises carbon black conductive filler not exceeding 1% by weight of dry blend.

In another aspect, the invention provides a dry cement blend comprising a hydraulic cement, carbon fiber and graphite.

In another aspect of the invention, a method of cementing a well is provided wherein the method comprises the step of pumping a slurry cement composition comprising: a hydraulic cement, water, carbon fiber and graphite. Advantageously, the carbon fiber is present in an amount not exceeding 5 kg per cubic meter and more advantageously, between 0.5 and 2 kg per cubic meter. Also advantageously, the graphite is present as coarse particulate graphite in an amount not exceeding 50% by weight of dry blend and more advantageously, in an amount between 20% and 50% by weight of dry blend.

Preferably, the method comprises the step of drilling the well and putting in a casing, wherein the step of cementing applies the cement around the casing. And the method further comprises the step of deploying a tool able to measure formation resistivity through casing and measuring said formation resistivity.

The new formulation of the invention will yield a cement sheath having a resistivity that will be at least 1-2 orders of magnitude below the formation resistivity. This will allow more signal to pass through the cement into the formation and improve penetration radius, as well as increase accuracy and resolution in the measurements of resistivity. While any available resistivity measurement tool may be used to measure in wells having cement compositions of the invention, preferably, measurement of the formation resistivity is done with a Cased Hole Formation Resistivity Tool (CHFR) provided by Schlumberger.

In another aspect, a method of measurement is disclosed wherein the method measures the formation resistivity of a well wherein the well comprises cement comprising carbon fiber and graphite.

Still in another aspect of the invention, the slurry of the invention can be used as a cathodic protection for a well.

BRIEF DESCRIPTION OF THE DRAWINGS

Further embodiments of the present invention can be understood with the appended drawings.

DETAILED DESCRIPTION

Figure 1:
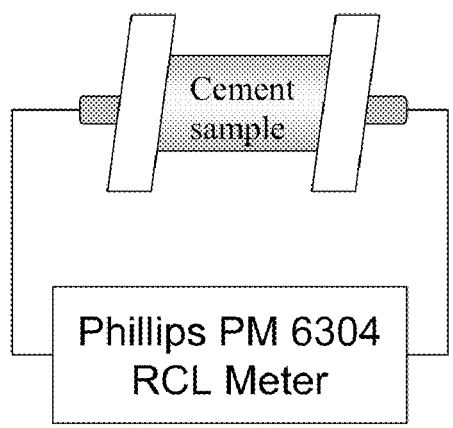
FIG. 1 shows the experimental setup for resistivity measurements.

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

According to the invention, the slurry cement composition for cementing a well comprises an hydraulic cement, water, carbon fiber and graphite. The most commonly reported carbon fiber for improving electrical properties in set cement has an average particle size equal to or greater than 6 mm. Similar electrical properties were achieved with 3 and 6 mm fibers but the addition of 3 mm fibers rendered the cement slurries unmixable. The slurries developed unacceptable rheological properties. For this reason, longer fibers are more useful in oilwell cement applications. Graphite is used as coarse particulate graphite average diameter is around 70 to 500 μm for the particle size.

Portland cement containing carbon fiber and particulate graphite demonstrates reduced cement resistivity values, when compared to the resistivity values of conventional cement with no fibers or graphite present. Small concentrations of carbon fiber provide a connective path through the cement matrix for electrons to flow.

Higher fiber concentrations result in slightly improved conductivity, but adversely affect cement slurry mixability/pumpability. Although higher particulate concentrations of graphite are required to improve conductivity, mixability remains acceptable. Therefore current invention is designed to significantly improve conductivity of conventional cement formulations, independent of density and porosity of the cement composite. Cement composites with varying porosity (46-49%) and density (15.2-16.4 ppg) have been tested with predetermined concentrations of carbon fiber and coarse particulate graphite. Preferably, carbon fiber is present in an amount not exceeding 2 or 5 kg/m$^3$ and the coarse particulate graphite is present in an amount not exceeding 50% BWOB (by weight of dry blend).

Other additives may be present in the blend such as filers, retarders, fluid loss prevention agents, dispersants, rheology modifiers and the like. In one embodiment, the blend also includes a polyvinyl chloride fluid loss additive (0.2-0.3% BWOB), polysulfonate dispersant (0.5-1.5% BWOB), carbon black conductive filler aid not exceeding 1.0% BWOB, and various retarders (lignosulfonate, short-chain purified sugars with terminal carboxylate groups, and other proprietary synthetic retarder additives). In some formulations, silica or other weighting additives, such as Hematite or Barite, may be used to optimize rheological properties of the cement composite slurry during placement across the zone of interest. Typically silica concentrations will not exceed 40% BWOC (by weight of cement). This is done to prevent strength retrogression when well temperatures may exceed 230° F. For most formulations, Hematite or Barite does not exceed 25% BWOB or BWOC.

While the addition of either carbon fiber (~2-5 kg/m$^3$) or particulate graphite (40-50% BWOB) signally provides some improvement to cement composite conductivity, evidence shows that composites with both components act synergistically and so the combination provides unexpected improvement in promoting conductivity as it will be show in the following examples.

Experimental Set-Up

There are two types of resistivity measurements, electronic and electrolytic, that characterize conductivity in oilwell cements. The first type of measurement is due to the movement of electrons through the conductive phase (i.e. carbon fibers and particulate graphite) and the second type of measurement is due to the motion of ions (i.e. $K^{2+}$, $Ca^{2+}$, $Na^+$) in the pore space. Since cement placed downhole is constantly exposed to various brines and moisture cannot easily escape the cement matrix, these two types of conductivity cannot be easily decoupled. Therefore, in this study, each sample was constantly exposed to a humidified environment at simulated downhole temperature (150° F.). At periodic intervals over a 30-day testing period, each sample was removed from the bath. Excess moisture was wiped off and the cells were allowed to equilibrate with ambient temperature for two hours. The electrodes were connected to the RCL Meter for measurement (as shown on FIG. 1). An alternative current signal was used because the specimens contained moisture and polarization effects were possible at specimen-electrode interfaces. The raw data were collected in resistance units and resistivity was calculated with the following expression:

$$\rho = \frac{1}{\sigma} = \frac{S}{L} \cdot R \quad (1)$$

where ρ is the resistivity, σ is conductivity, S is the cross-sectional area of the conductive path, L is the path length, and R is the resistance.

The properties of resistivity and conductivity are inversely proportional. A testing matrix was chosen to consider the synergy between two different sized particulates (carbon black and course graphite) and two different sized graphite fibers (3 and 6 mm). The matrix is provided in Table 1 below.

TABLE 1

| | Composite Blend Components | | | Physical Properties | | | |
|---|---|---|---|---|---|---|---|
| | Carbon Black | Carbon Fiber | Course Graphite | | Density | Resistivity (ohm · meter) | |
| Systems | (% BWOB) | (gms/mL) | (% BWOB) | SVF | g/cm³ (ppg) | 5 days | 30 days |
| 1-1 | 0 | 0.000 | 0 | 47.6 | 1.99 (16.6) | 0.081 | 0.141 |
| 1-2 | | 0.001 | | | | 0.032 | 0.047 |
| 1-3 | | 0.002 | | | | 0.024 | 0.041 |
| 1-4 | | 0.003 | | | | NA | NA |
| 1-5 | | 0.010 | | | | 0.006 | 0.010 |
| 1-6 | | 0.000 | 50 | 47.8 | 1.84 (15.4) | 0.039 | 0.084 |
| 1-7 | | 0.001 (6 mm) | | | | 0.013 | 0.038 |
| 1-8 | | 0.002 (6 mm) | | | | 0.006 | 0.020 |
| 1-9 | | 0.001 (3 mm) | | | | 0.016 | 0.041 |
| 1-10 | | 0.002 (3 mm) | | | | 0.008 | 0.019 |
| 1-11 | 1 | 0.000 | 0 | 47.0 | 1.96 (16.4) | 0.086 | 0.102 |
| 1-12 | | 0.001 | | | | 0.035 | 0.048 |
| 1-13 | | 0.002 | | | | 0.017 | 0.025 |
| 1-14 | | 0.003 | | | | 0.011 | 0.021 |
| 1-15 | | 0.000 | 20 | 46.5 | 1.87 (15.6) | 0.073 | 0.145 |
| 1-16 | | 0.002 | | | | 0.015 | 0.055 |
| 1-17 | | 0.003 | | | | 0.018 | 0.042 |
| 1-18 | | 0.005 | | | | 0.006 | 0.032 |
| 1-19 | | 0.000 | 40 | 46.9 | 1.82 (15.2) | 0.051 | 0.064 |
| 1-20 | | 0.001 | | | | 0.023 | 0.036 |

Table 1 is a summary of the different systems tested to develop cement composites with superior electrical properties, from acceptable mixability and pumpability in the field to develop superior electrical properties in the set cement.

The cement used in this study was Portland API Class G. The measured composition of Class G is 55 wt % $C_3S$, 22-28 wt % $C_4AF$, 5.0 wt % $C_3A$, 2.9% $SO_3$, 0.8% MgO, 0.55 wt % Alkalies ($Na_2O.0.66\ K_2O$), and other trace components. For the purposes of discussion, the following nomenclature is used to describe systems tested in this study: Example: 0-0.002-0 (0% BWOB carbon black—0.002 gms/mL carbon fiber—0% BWOB coarse graphite). I.e., the first number represents the concentration of carbon black in % BWOB, the second number represents the concentration of carbon fiber in gms/mL, and the last number represents the concentration of course particulate graphite in % BWOB.

EXAMPLES

Example 1

Figure 2:
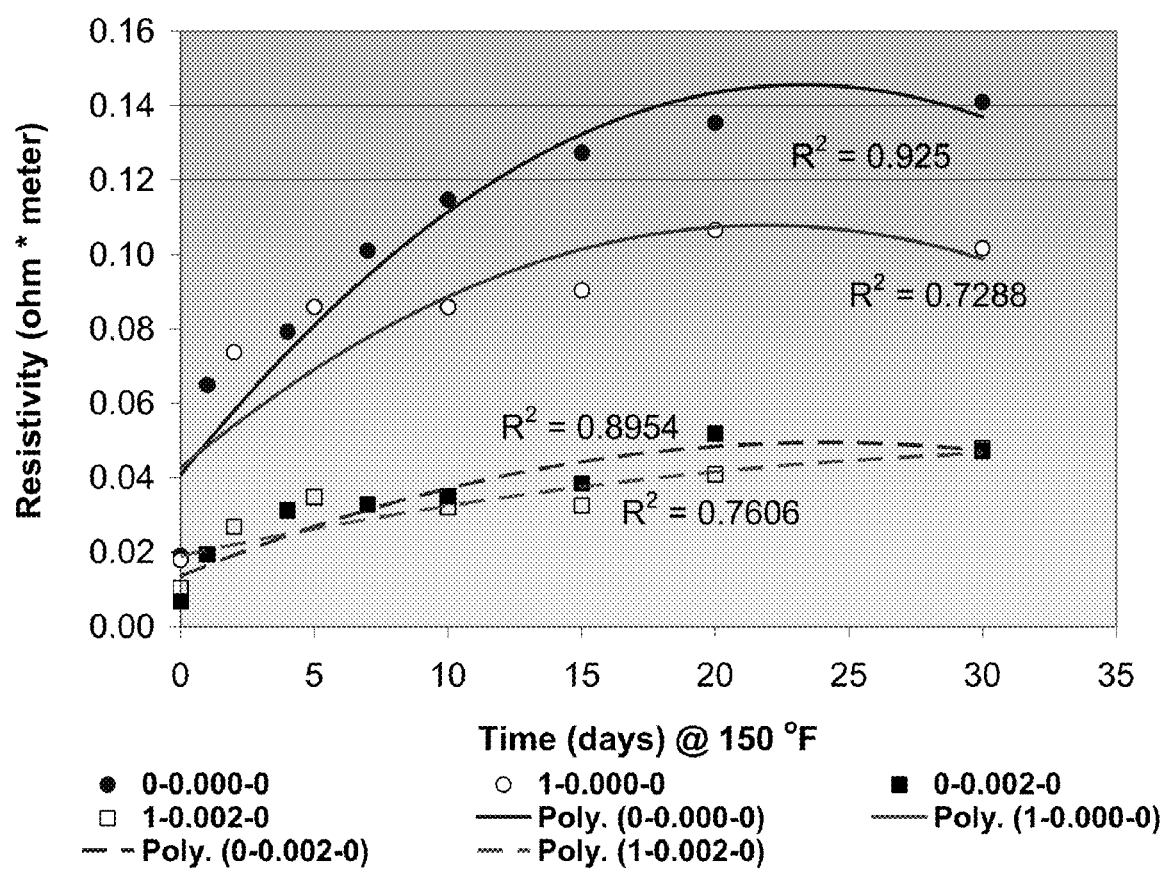
FIG. 2 shows the impact of carbon black on cement resistivity.

The relationship between carbon black and cement resistivity is summarized in FIG. 2. Two different studies were performed to determine the influence of carbon black on cement resistivity. In both studies, carbon black had little or no effect on cement resistivity.

Example 2

Figure 3:
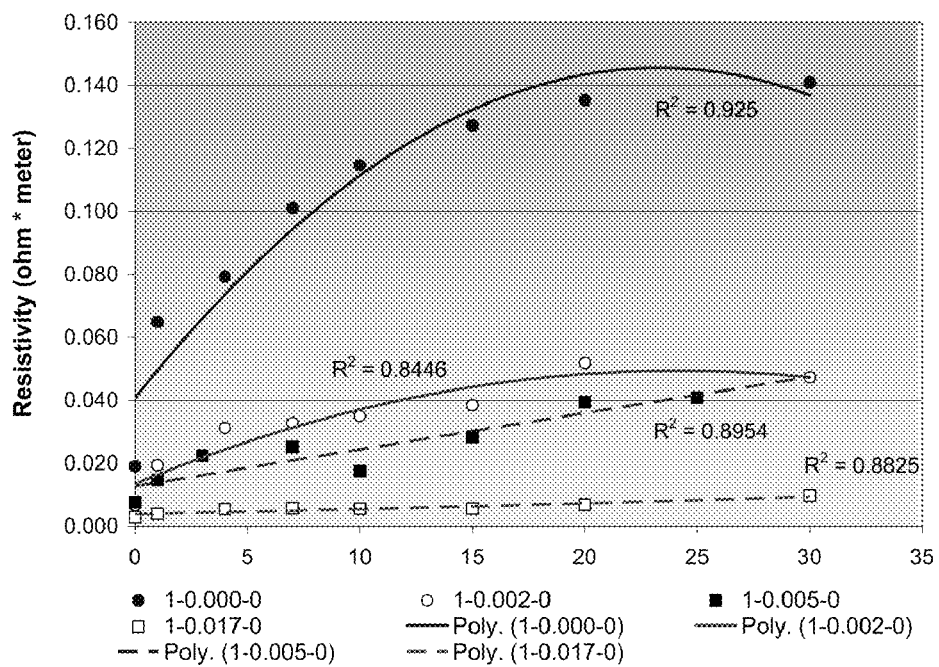
FIG. 3 shows the impact of carbon fiber on cement electrical properties.
Figure 4:
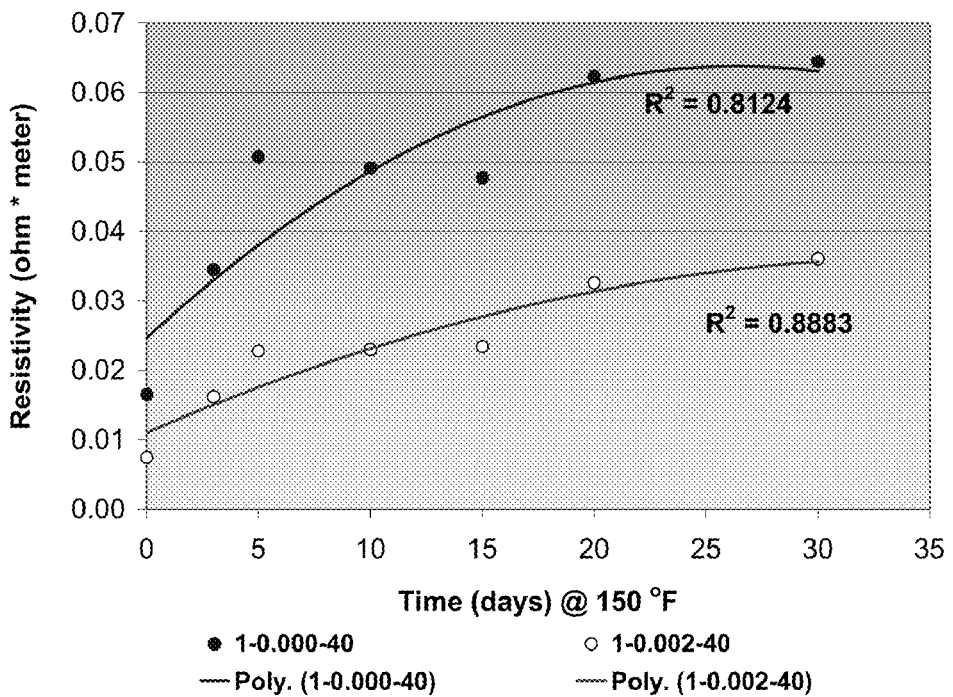
FIG. 4 shows data demonstrating significant improvement in conductivity when adding carbon fibers to cement composite with carbon black and coarse graphite.

The next study focused on the relationship between carbon fiber concentration and cement conductivity. FIGS. 3 and 4 summarize the results. In FIG. 3, the carbon fiber was varied from 0 to 17 kg/m³. In FIG. 3, the effect of carbon fiber (6 mm) on cement resistivity was measured with carbon black held constant. Beginning with the addition of 2 kg/m³ carbon fiber, the cement resistivity was considerably reduced. After 30 days curing at 150° F., cement resistivity with 5 kg/m³ was 0.043Ω·m. Further improvement was observed at 10 kg/m³ but with a substantial increase in viscosity this concentration was deemed unsuitable for oilwell cementing applications. In FIG. 4, an additional study evaluated the influence of carbon fiber on cement resistivity with a cement sample containing coarse particulate graphite (40% BWOB). Again, the addition of carbon fiber significantly reduced cement resistivity from 0.065 to 0.037Ω·m after 30 days curing at 150° F. Testing with higher fiber concentrations was not feasible due to viscosification of the sample.

Figure 5:
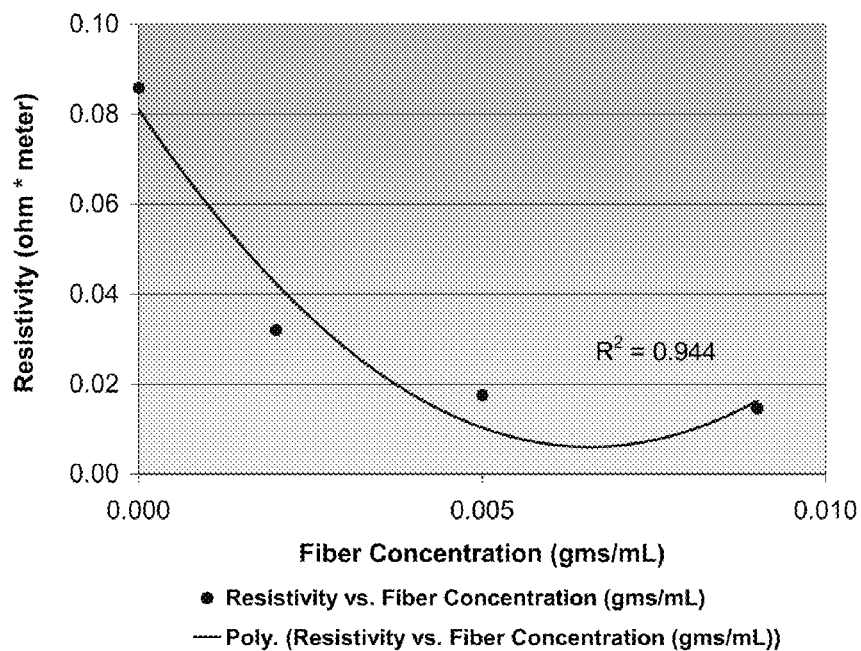
FIG. 5 shows relationship between fiber connectivity and cement composite electrical properties.
Figure 6:
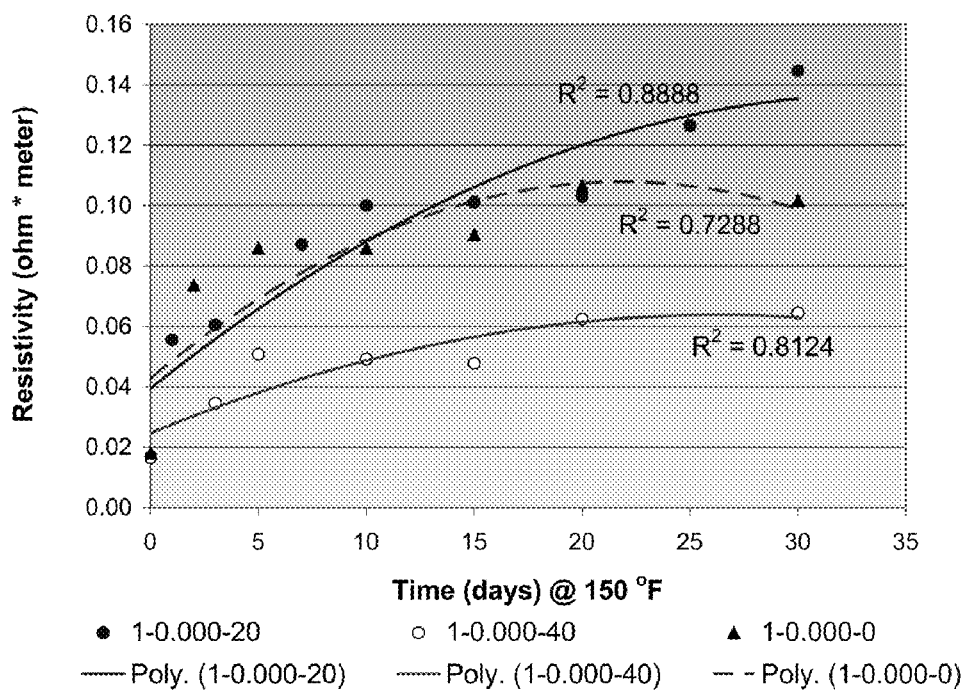
FIG. 6 shows influence of coarse particulate graphite on cement resistivity.

During testing of carbon fiber systems, a threshold or percolation effect was observed. According to one study, fibers at low concentrations collect in packets with high localized conductivity but low connectivity across the cement matrix. At a "threshold" fiber concentration, the fibers have enough interconnectivity across the cement matrix to conduct a current. FIG. 5 demonstrates the effect of increasing fiber concentration on cement resistivity after 10 days curing at 150° F. In this study with 1% BWOB carbon black, carbon fiber demonstrated a threshold between 5-9 kg/m³. An increase to 9 kg/m³ carbon fiber failed to significantly improve the electrical properties of the sample. An illustration of the threshold concept is placed beside each measurement. This demonstrates the link between increased fiber connectivity and improved electrical properties through the sample.

Example 3

Figure 7:
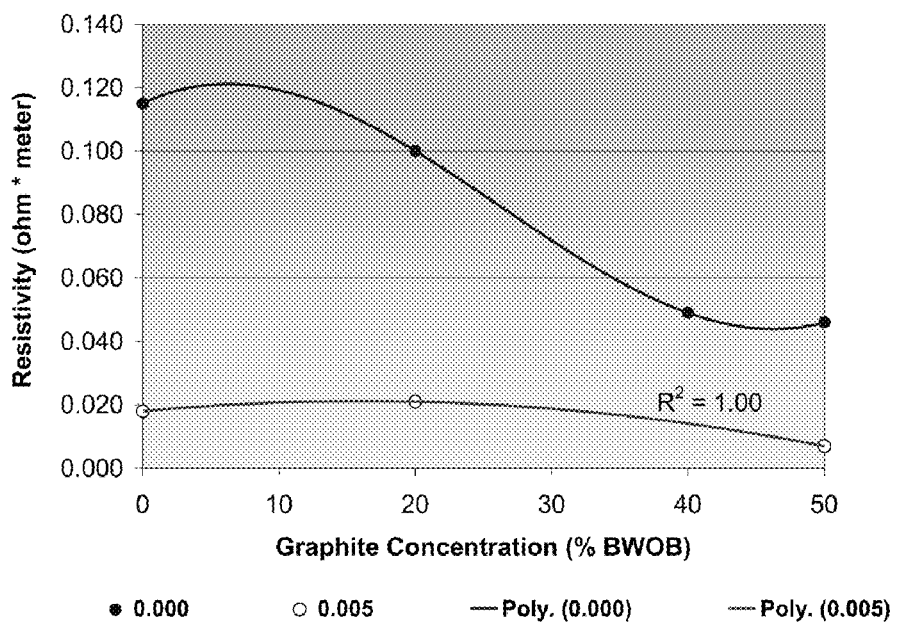
FIG. 7 shows impact of coarse particulate graphite on cement conductivity and the synergy between coarse particulate graphite and fibrous graphite.
Figure 8:
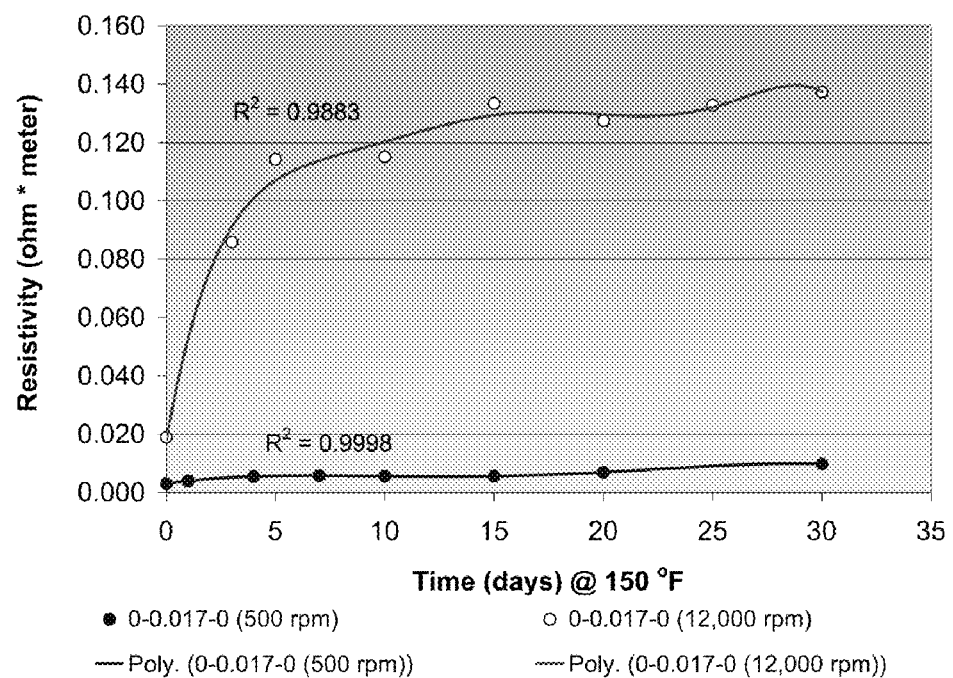
FIG. 8 shows impact of shear on carbon fiber integrity and electrical properties of cement composite samples.

The effect of coarse graphite particles on cement resistivity is plotted in FIGS. 7 and 8. In FIG. 7, the measurements were performed under two conditions: no carbon fiber and carbon fiber at a concentration of 5 kg/m³. Coarse particulate graphite had a significant effect on cement resistivity. After 30 days curing at 150° F., 20% BWOB graphite had little or no effect on resistivity. However, between 20-40% BWOB, there appeared to be enough proximity between adjacent graphite particles in the cement matrix to improve the electrical properties.

The relationship between particulate graphite concentration and cement resistivity are demonstrated in FIG. 8. In this study, the impact of coarse graphite was first studied without carbon fiber present in the composite. The carbon fiber was added at the threshold value (2 kg/m³). In the sample without carbon fiber, the addition of particulate graphite had a significant effect on resistivity. There appears to be a "threshold" effect . . . similar to carbon fiber cement composite samples. In the samples containing carbon fiber and particulate graphite, the effect of particulate graphite on cement electrical properties was not as significant but still measurable. The resistivity was reduced from 0.180 to 0.007Ω·m when particulate graphite concentration was increased from 0 to 50% BWOB, respectively. From measurements obtained in this study, there appeared to be a synergistic relationship between coarse particulate graphite and carbon fiber materials. However, in samples tested before, addition of coarse particulate did not appear to lower the threshold for cement composites containing carbon fiber. The threshold for carbon fiber composites remained between 2-5 kg/m$^3$.

Example 4

In order to determine the effect of shear on carbon fiber integrity and threshold required to express acceptable electrical properties, a cement composite sample with 17 kg/m$^3$ carbon fiber was exposed to two different shear environments and compared to a control sample. From this preliminary study, high shear rates have a significant and irreversible effect on cement conductivity. After 1 minute shearing at 12,000 rpm, carbon-fibers were degraded to very small particles and lost their fibrous character. Carbon fiber cement samples lose their electrical properties after exposure to high shear rates for even short periods of time, with resistivities very similar to conventional cement.

Finally, all particulate conductive materials were added to the cement powder prior to mixing as part of the blend and were sheared at 12,000 rpm. Further, all measurements of coarse graphite particles show excellent conductivity at higher concentrations (greater than 40% BWOB). Therefore, it is essential that for a high-shear environment (12,000 rpm) that might be faced when cement composite slurries are circulated through centrifugal pumps during field placement, particulate graphite be used in combination with carbon fiber to offset potential shearing damage to the fibers. Since fibers provide better overall conductivity and particulate graphite provides better shear resistance, it is recommended to use both materials in cement composites used in oilwell applications where high shear environments are anticipated.

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. A method of cementing a well comprising the steps of:
   a) forming a cement slurry composition comprising a hydraulic cement, water, carbon fiber and coarse particulate graphite having an average particle size of from about 70 to about 500 µm, and
   b) pumping the cement slurry.

2. The method of claim 1, wherein the carbon fiber is present in an amount not exceeding 5 kg per cubic meter.

3. The method of claim 2, wherein the carbon fiber is present in an amount between 0.5 and 2 kg per cubic meter.

4. The method of claim 1 wherein the slurry is formed by mixing a dry blend comprising hydraulic cement, carbon fiber and graphite with water.

5. The method of claim 4, wherein the graphite is present in the dry blend in an amount not exceeding 50% by weight of the dry blend.

6. The method of claim 4, wherein the graphite is present in an amount between 20% and 50% by weight of the dry blend.

7. The method of claim 4, further comprising carbon black conductive filler not exceeding 1% by weight of the dry blend.

8. The method of claim 1, further comprising the step of drilling the well and putting a casing, wherein the step of pumping the cement into the well applies cement to the casing.

9. The method of claim 1, further comprising the step of deploying a tool able to measure formation resistivity through casing and measuring said formation resistivity.

10. A method of measurement of the formation resistivity of a well comprising the step of applying a signal to a well, wherein the well comprises a cement comprising a hydraulic cement, water, carbon fiber and coarse particulate graphite having an average particle size of from about 70 to about 500 µm.

11. The method of claim 10, further comprising the step of deploying a tool able to measure formation resistivity through casing and measuring said formation resistivity.

12. The method according to claim 11, wherein the tool is a cased hole formation resistivity tool.

13. A method for improving the accuracy and resolution of resistivity measurement of a well comprising:
   (i) drilling a well;
   (ii) putting a casing;
   (iii) mixing a dry blend comprising hydraulic cement, carbon fiber and graphite having an average particle size of from about 70 to about 500 µm with water to form a slurry;
   (iv) pumping said slurry downhole to form once cement has set a cement sheath around the casing;
   (v) deploying a tool able to measure formation resistivity through casing
   (vi) measuring formation resistivity.

14. The method of claim 13 wherein the carbon fiber is present in an amount not exceeding 5 kg per cubic meter.

15. The method of claim 14 wherein the carbon fiber is present in an amount between 0.5 and 2 kg per cubic meter.

16. The method of claim 13 wherein the graphite is present in the dry blend in an amount not exceeding 50% by weight of the dry blend.

17. The method of claim 16 wherein the graphite is present in an amount between 20% and 50% by weight of the dry blend.

18. The method of claim 13 further comprising carbon black conductive filler not exceeding 1% by weight of the dry blend.

19. The method of claim 13 wherein the cement sheath formed allows more signal than a conventional cement to pass through the cement into the formation and improve penetration radius.

20. The method of claim 13 whereas the cement sheath once formed has a resistivity that is at least 1-2 orders of magnitude below the formation resistivity.

* * * * *